UNITED STATES PATENT OFFICE.

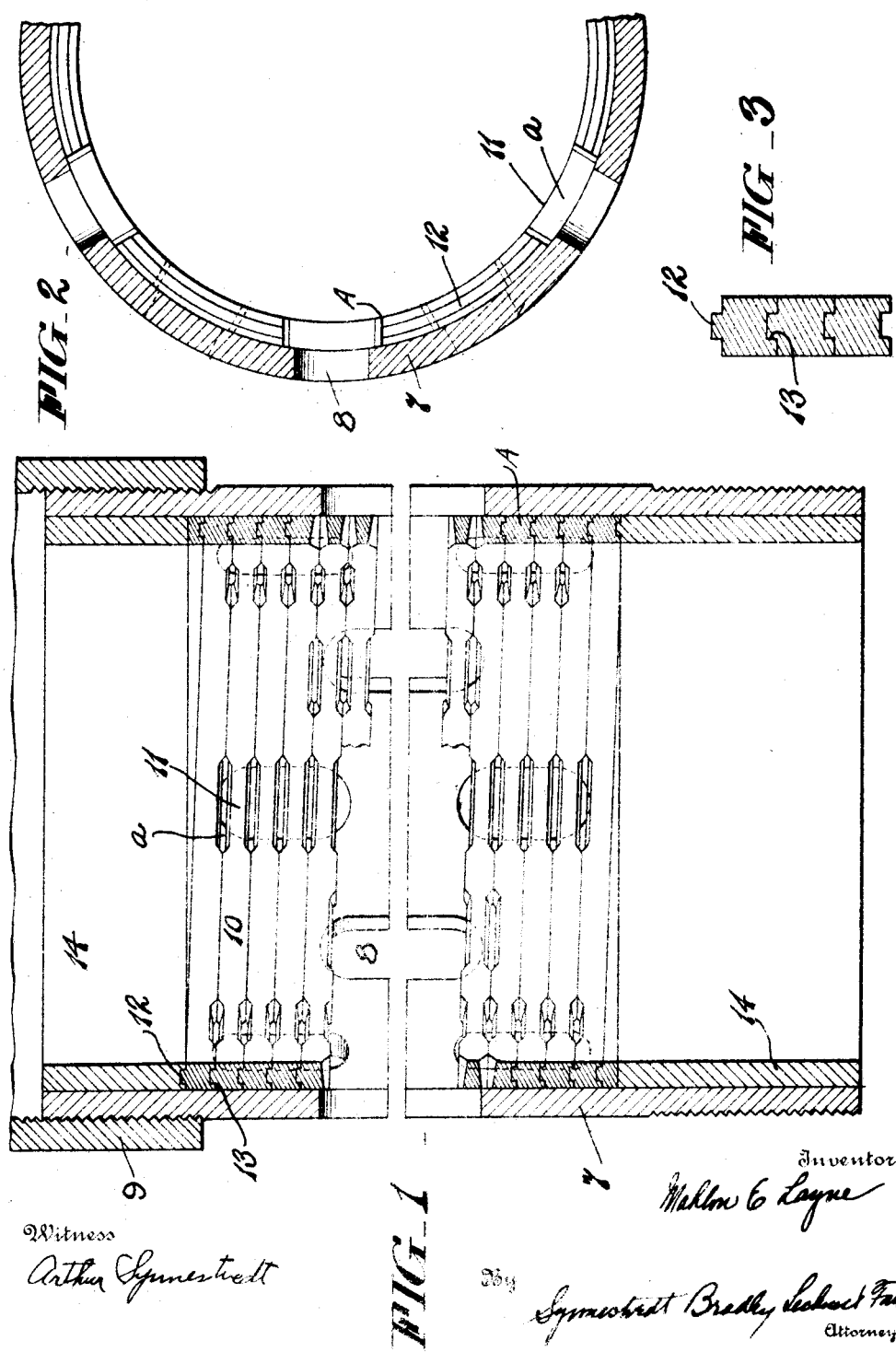
M. E. LAYNE.
WELL SCREEN AND METHOD OF MAKING THE SAME.
APPLICATION FILED MAR. 17, 1917.
1,367,609. Patented Feb. 8, 1921.
2 SHEETS—SHEET 1.

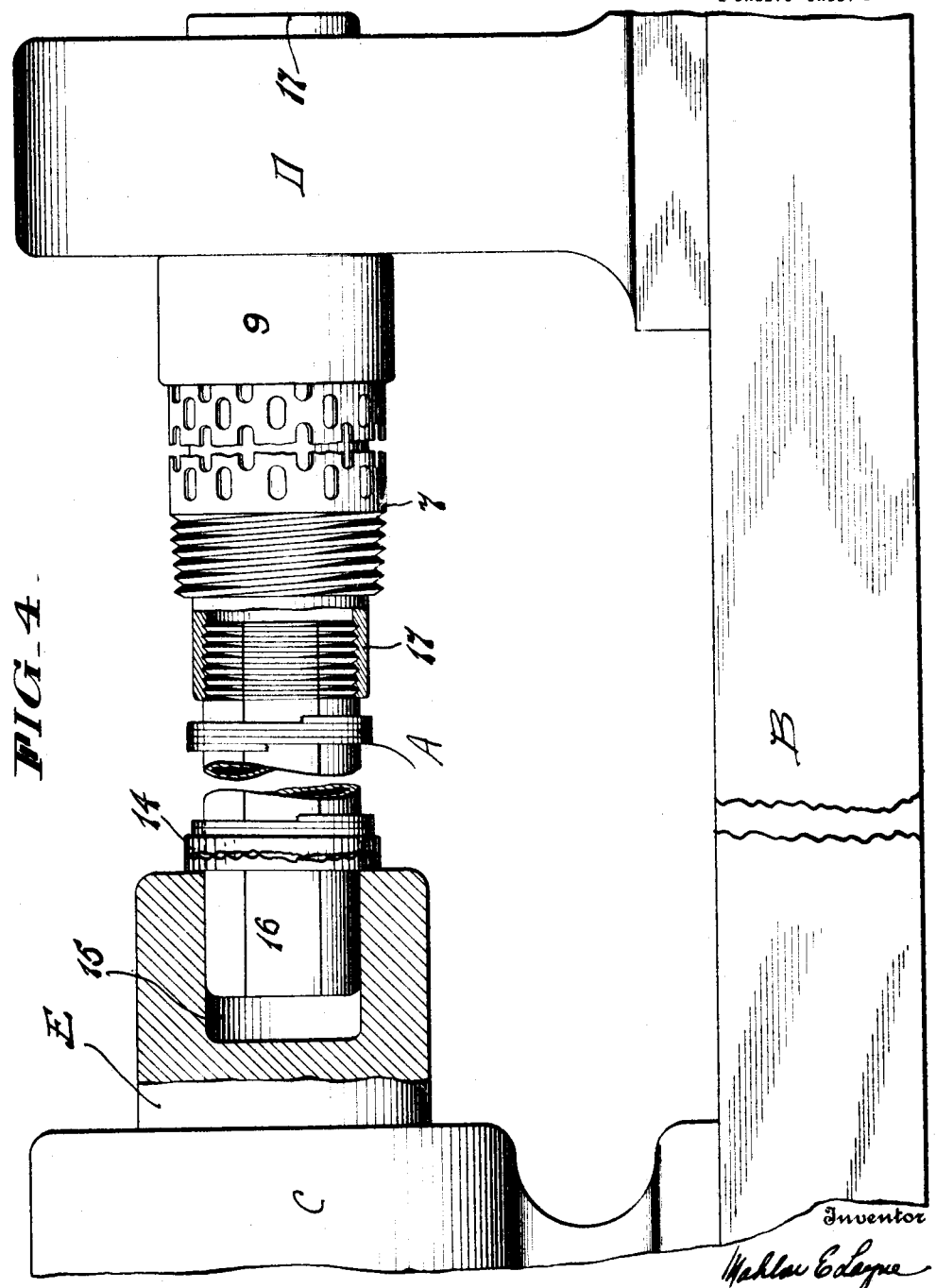

MAHLON E. LAYNE, OF MEMPHIS, TENNESSEE.

WELL-SCREEN AND METHOD OF MAKING THE SAME.

1,367,609.  Specification of Letters Patent.  Patented Feb. 8, 1921.

Application filed March 17, 1917. Serial No. 155,403.

*To all whom it may concern:*

Be it known that I, MAHLON E. LAYNE, a citizen of the United States, residing at Memphis, in the county of Shelby and State of Tennessee, have invented certain new and useful Improvements in Well-Screens and Methods of Making the Same, of which the following is a specification.

This invention relates to an improvement in well screens for oil and water wells and to method of making the same; and it has for one of its primary objects the provision of a novel form of screen in which the helix of screening wire is located on the interior instead of on the exterior of the perforated casing or the foraminous framework, which is usually employed in well screens as the foundation or framework for supporting the helix. Another object of my invention resides in the provision of an improved construction and arrangement of such a screen having means for supporting the screening element therein.

My invention also contemplates a simple and economical and expeditious method for forming such a well screen.

The foregoing, together with such other objects as may hereinafter appear or are incident to my invention, I obtain by means of a construction and method, the preferred embodiments of which I have shown in the accompanying drawings, wherein—

Figure 1 is a longitudinal section through an improved well screen embodying my invention, an intermediate portion of the screen being broken away; Fig. 2 is a horizontal section through a portion of the well screen shown in Fig. 1; Fig. 3 is a section through several strands of the screening wire drawn on an enlarged scale; and Fig. 4 is a side elevation and partial section of a machine utilized in constructing the well screen section.

In oil and water wells it is customary to provide at the bottom of the well several sections or lengths of well screen, suitably coupled together and coupled to a well tube or casing, the screening sections being adapted to exclude foreign matter and detritus from the interior of the well tube.

I propose to so construct these well screening sections that the helix of screening wire is located on the interior of the perforated well tube or other foraminous framework instead of upon the exterior of which it has been customary to support the helix.

In Fig. 1, I have shown a cross-section of such a well screen section, from an inspection of which it will be seen that the section comprises a length of well tubing or casing 7 which is provided with a plurality of apertures 8 arranged in rows lengthwise of the tube, the perforations of one row being staggered with respect to the perforations of the adjacent rows. The tube 7 is threaded at the top and bottom for the reception of coupling members 9 wherewith adjacent sections may be coupled together and to the well tube proper. Within the tube 7 is wound a helix of screening wire A, such screening wire being substantially square in cross-section and having alternate thick and thin portions respectively numbered 10 and 11, the thin portions being adapted to provide circulating channels $a$ and the thick portions being adapted to abut against each other. On the upper and lower faces of the strands, and throughout the length of the thick portions 10, are respectively formed a tongue 12 and a groove 13, the tongues and grooves interfitting and locking the strands together, thereby preventing external pressure from collapsing or shifting any portion of the helix. The alternate thick and thin portions of the wire are so disposed that when the helix is formed, the thick portions 10 will aline and form longitudinal bar-like members extending throughout the length of the helix, while the thin portions will also aline, thus creating rows of circulating channels $a$ which will come opposite to the rows of perforations 8 in the tube 7. This construction makes the helix very rigid and strong and at the same time provides a maximum total circulation area. By locking the helix within the tube, I secure a screening element which will last indefinitely and which cannot possibly be injured when inserting the screening sections into the well. At the same time, there is less liability of the circulating channels becoming clogged. Heretofore, it was probably thought impractical to construct such an arrangement of well screen, one of the reasons being first the difficulty in providing a screen which would be strong enough and in the second place the difficulty in inserting and assembling such a screen.

The first difficulty is overcome in my improved construction by reason of the peculiar form of screening wire, this being such that I am not only enabled to use screening wire of maximum depth and width, but can secure additional strength and rigidity by virtue of the thick portions 10, which it will be noted, are of extended character and bear one against the other throughout their length, and which, further, are provided with interlocking portions. In order to destroy such a screen, it will be apparent that the bar-like formations of the thick portions 10 would have to be collapsed substantially as an entirety.

The helix of wire which is tightly squeezed against the interior face of the tube, as will further appear, is positioned within the tube by means of the collars or sleeves 14 which are suitably fastened or secured to the tube by welding or other means, and serve to hold the helix in expanded position.

The manner in which the screen is constructed will now be described, attention being directed to Fig. 4 which illustrates a machine B for carrying out the operations. This machine is provided with two standards C and D, the former of which constitutes a bearing for the ram member E, which is preferably actuated by hydraulic means (not shown); which ram has a central opening 15 adapted to receive the end of a collapsible mandrel 16. This collapsible mandrel has its opposite end mounted in a guide mandrel 17 which slidably fits the sleeve 14 within the perforated well tube 7, the end of the guide mandrel 17 being slidably mounted in the standard D. The tube 7 is shown provided with a coupling 9 at one end which coupling takes against the side of the standard D. It will, of course, be understood that the standards C and D are spaced far enough apart to receive the full length of a section of tube 7 and a full length of screen helix on the mandrel 16, and it is also to be understood that at the coupling end of the tube, one of the internal sleeves 14 has been positioned to support the guide mandrel as above noted.

The helix of wire A is now wound upon the collapsible mandrel 16 in loose relation, that is to say, the strands are placed a slight distance apart somewhat in the nature of a very finely wound spring and in this connection, it is to be observed that the external diameter of the collapsible mandrel is such that when the helix has been wound upon it, the external diameter of the helix will be slightly less than the internal diameter of the tube 7. When the completed section of helix has been wound and its end temporarily fastened, the ram E is advanced and pushes the guide mandrel 17 and the collapsible mandrel 16 and the sleeve 14 and the helix A carried by the collapsible mandrel, into the interior of the tube 7 until such time as the forward end of the helix abuts against the sleeve 14 which has already been secured to the interior or forward end of the tube 7. As the forward movement of the ram E continues beyond this point, it will compress the strands of the helix tightly together. The effect of this compression of the helix obviously is to increase its external diameter thus bringing it snugly against the interior of the tube 7. The sleeve 14 is then either temporarily or permanently secured in position, the mandrel 16 is collapsed and withdrawn and the completed screen can be drawn off the guide mandrel 17. It is to be noted that the external diameter of the guide mandrel is about the same as the internal diameter of the sleeve 14 so that the latter will freely slide thereover.

From the foregoing it will be seen that the screen may be simply and expeditiously wound and inserted in position and secured in such manner as to provide a very effective screening element having all of the advantages hereinbefore pointed out.

It will, of course, be apparent that when the strands of the helix are compressed the tongues and grooves will be caused to interlock.

The screening wire may be shaped at any preferred time, as for example, as it is leaving the rolls and is being wound upon the collapsible mandrel and if desired, the meeting faces of adjacent strands or coils of the helix may be coated with a chemical as will cause the coils to rust together or self-cement themselves.

I claim:

1. The herein described process of making well screens having an external supporting frame which consists in winding a helix of screening wire of a size permitting of insertion of the helix in said frame, and thereafter in expanding said helix against the interior wall of the frame.

2. The herein described process of making well screens having an external supporting frame which consists in winding a helix of screening wire with coils spaced apart, inserting said helix within the frame and then in expanding the helix against the interior wall of the frame by compressing the strands together.

3. The herein described process of making well screens having an external supporting frame which consists in winding a helix of screening wire of a size permitting of insertion of the helix in said frame, and thereafter in compressing said helix longitudinally to expand it transversely against the interior of the frame.

4. The herein described process of making well screens having an external supporting frame which consists in winding a helix of screening wire of smaller diameter than the inside transverse dimension of the frame, in inserting said helix within said frame, and in bringing the inside surface of the frame into contact with the outside surface of the helix by expansion of the helix.

5. As a new article of manufacture, a well screen comprising an external foraminous foundation or main frame, a helix of screening wire within said frame of an external diameter approximating the internal diameter of the main frame, and means for securing the helix in position.

6. As a new article of manufacture, a well screen comprising an external foraminous supporting frame, an internal helix of screening wire having alternate thick and thin portions wound so that similar portions aline and placed so that the thin portions come opposite perforations, said helix being in close contact at all points with the outer supporting frame, and fixed abutments at each end of the helix for maintaining the helix in position.

7. As a new article of manufacture, a well screen comprising an external foraminous main frame having means for attachment to adjacent sections, an internal helix of screening wire of substantially the same diameter as the internal diameter of the frame and two fixed abutments for maintaining said helix in position.

8. As a new article of manufacture, a well screen comprising an external foraminous supporting frame and an internal helix of screening wire, the strands of said helix being in close contact with the frame at all points.

In testimony whereof, I have hereunto signed my name.

MAHLON E. LAYNE.